United States Patent
Anastasov

(10) Patent No.: US 9,100,163 B2
(45) Date of Patent: Aug. 4, 2015

(54) TRANSMITTER, RECEIVER, METHOD FOR TRANSMITTING AND METHOD FOR RECEIVING

(71) Applicant: Infineon Technologies AG, Neubiberg (DE)

(72) Inventor: Ljudmil Anastasov, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/180,401

(22) Filed: Feb. 14, 2014

(65) Prior Publication Data

US 2014/0226770 A1     Aug. 14, 2014

Related U.S. Application Data

(62) Division of application No. 13/072,830, filed on Mar. 28, 2011, now Pat. No. 8,699,617.

(51) Int. Cl.
*H04L 7/00* (2006.01)
*H04B 15/04* (2006.01)

(52) U.S. Cl.
CPC .............. *H04L 7/0079* (2013.01); *H04B 15/04* (2013.01); *H04L 7/0091* (2013.01)

(58) Field of Classification Search
USPC ......... 375/358, 316, 356, 355, 362, 354, 296, 375/303, 308, 295
See application file for complete search history.

(56) References Cited

U.S. PATENT DOCUMENTS

| | | | |
|---|---|---|---|
| 6,353,604 B2 * | 3/2002 | Grimwood et al. ........... 370/335 |
| 7,778,370 B2 * | 8/2010 | Aytur et al. .................... 375/365 |
| 8,289,947 B2 * | 10/2012 | El Kolli et al. ................ 370/350 |

FOREIGN PATENT DOCUMENTS

| | | |
|---|---|---|
| CN | 101291208 A | 10/2008 |
| CN | 101631016 A | 1/2010 |

OTHER PUBLICATIONS

Office action received for Chinese Patent Application No. 201210085779.2, mailed on Jun. 27, 2014, 9 pages of office action and 17 pages of English Translation.

* cited by examiner

*Primary Examiner* — Qutbuddin Ghulamali

(57) ABSTRACT

According to an embodiment, a transmitter is described comprising an input configured to receive a plurality of symbols to be transmitted and a timing circuit configured to associate each symbol with a symbol transmission period of a predefined sequence of symbol transmission periods, wherein the symbol transmission periods of the sequence of symbol transmission periods are at least partially different.

13 Claims, 18 Drawing Sheets

TRANSMITTER, RECEIVER, METHOD FOR TRANSMITTING AND METHOD FOR RECEIVING

CROSS-REFERENCE TO RELATED APPLICATION

This application is a divisional of U.S. application Ser. No. 13/072,830, filed 28 Mar. 2011, the content of it being hereby incorporated by reference in its entirety for all purposes.

TECHNICAL FIELD

Embodiments generally relate to a transmitter, a receiver, a method for transmitting and a method for receiving.

BACKGROUND

In serial asynchronous communication between a transmitter and a receiver it is required that the transmitter and the receiver are synchronized. Since the local oscillator in the transmitter and the local oscillator in the receiver typically operate at frequencies that are slightly different, e.g. due to imperfections or deliberately to reduce electromagnetic emission, there is typically a frequency drift between the transmitter and the receiver that may cause the requirement for a re-synchronization after a certain period of communication. It is desirable to reduce the number of necessary re-synchronizations.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
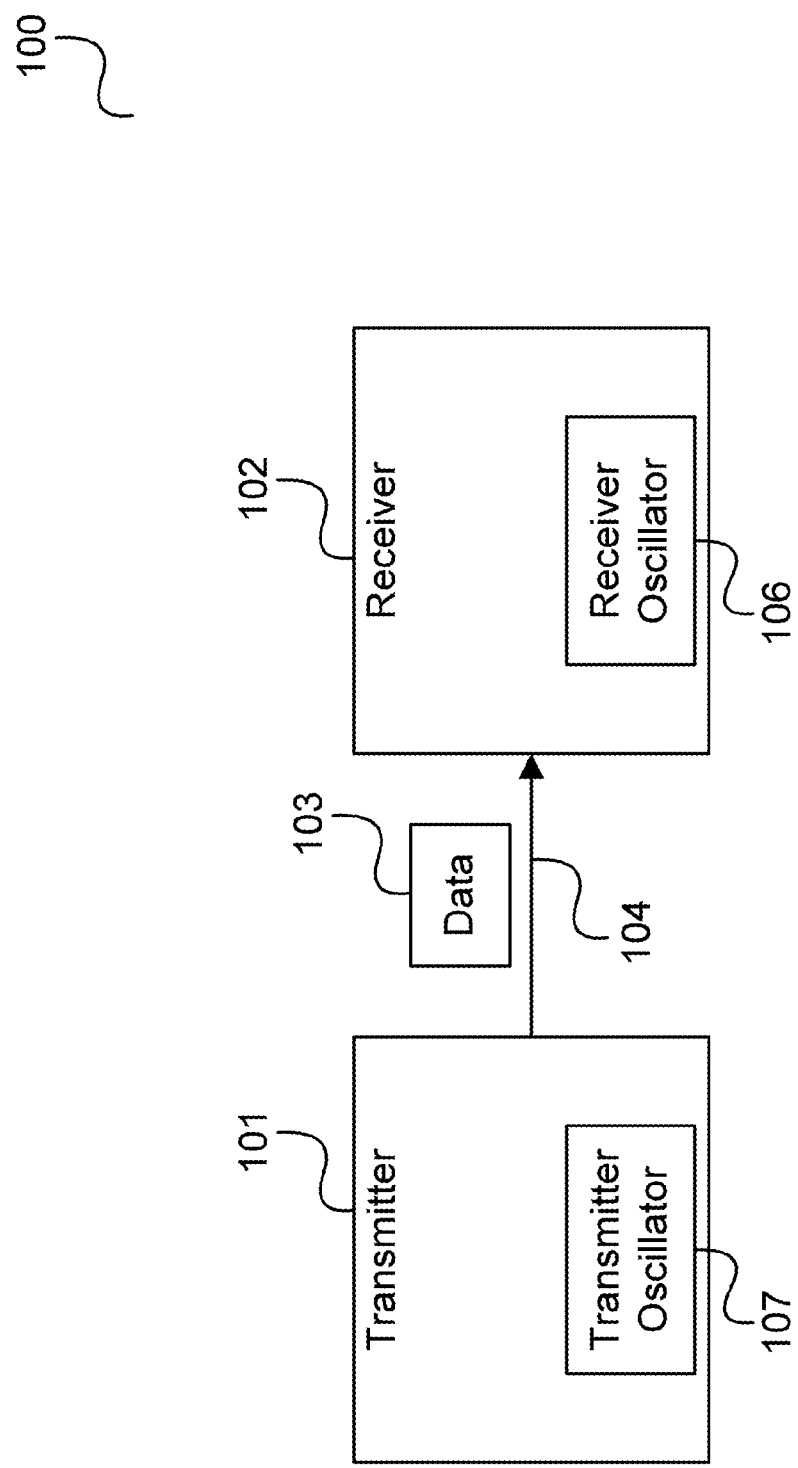
FIG. 1 shows a communication arrangement according to an embodiment.

FIG. 1 shows a communication arrangement 100 according to an embodiment.

The communication arrangement 100 includes a transmitter 101 and a receiver 102.

The transmitter 101 sends data 103 via a communication channel 104 to the receiver 102.

The data 103 is for example sent via the communication channel 104 serially (e.g. in a stream of bits or generally transmission symbols such as ASCII characters) and the communication between the transmitter 101 and the receiver 102 is asynchronous. For example, the communication channel 104 is an Asynchronous Serial Channel (ASC), e.g. operating according to RS232 (Recommended Standard 232). The communication channel 104 may also operate according to any other asynchronous communication protocol such as LIN (Local Interconnect Network), CAN (Controller Area Network), FlexRay, etc.

The transmitter 101 and the receiver 102 may be installed on one printed circuit board such that the communication via the communication channel 104 is a communication on the printed circuit board or may be separate components, e.g. mounted on different printed circuit boards. For example the transmitter 101 is part of a controller and the receiver 102 is part of a controlled component, for example in a vehicle.

The data 103 is transmitted over the communication channel 104 using transmission symbols that are transmitted at certain transmission times. To be able to determine the transmission times, the transmitter 101 includes a transmitter oscillator 105 and the receiver includes a receiver oscillator 106. The oscillators 105, 106 each provide a timing signal (e.g. a digital clock signal) used for determining the symbol transmission times.

Figure 2:
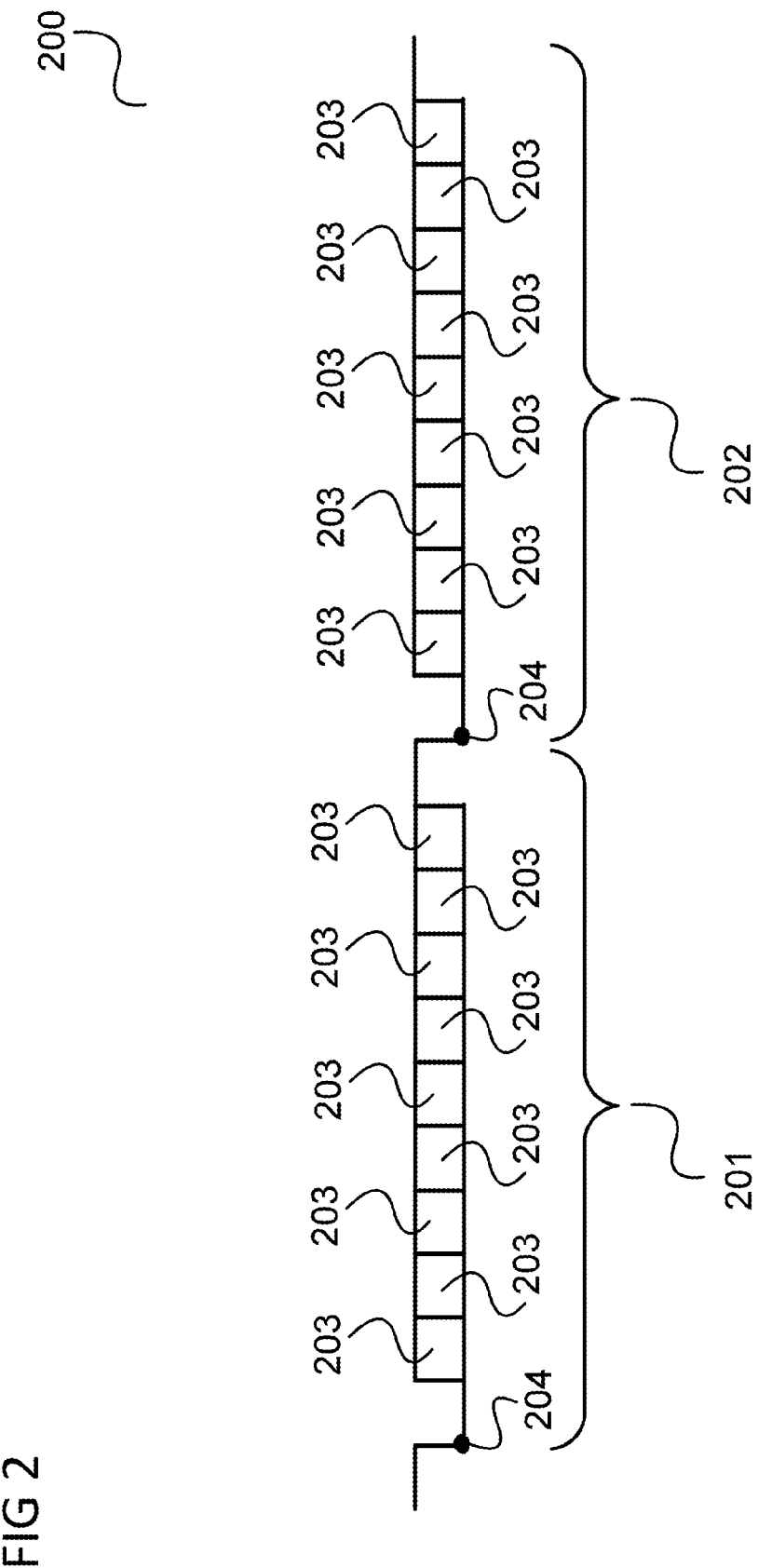
FIG. 2 shows a frame structure.

A communication via the communication channel 104 using asynchronous communication with constant symbol transmission periods (in other words symbol transmission intervals, e.g. bit transmission intervals) is illustrated in FIG. 2.

FIG. 2 shows a frame structure 200.

In this example, communication via the communication channel 103 is structured according to a plurality of frames, wherein a first frame 201 and a second frame 202 are illustrated in FIG. 2 as an example. Each frame includes a plurality of symbol transmission periods 203 wherein in each symbol transmission period 203 a transmission symbol is transmitted from the transmitter 101 to the receiver 102. The transmission symbols that are transmitter represent the data 103, e.g. in encoded form.

In the example illustrated in FIG. 2, constant symbol transmission periods are used. This means that all symbol transmission periods 203 have the same length.

An important aspect of asynchronous communication may be seen in the frequency deviation between the transmitter oscillator 105 and the receiver oscillator 106. This means that the frequency of the timing signal provided by the transmitter oscillator 105 and the frequency of the timing signal provided by the receiver oscillator differ. This may be due to imperfect operation of the transmitter oscillator 105 and/or the receiver oscillator 106 or also deliberate. For example, the transmitter oscillator 105 may be configured to provide the timing signal at a varying frequency to avoid generating electromagnetic transmission in a narrow frequency spectrum with high energy spectral density.

Figure 3:
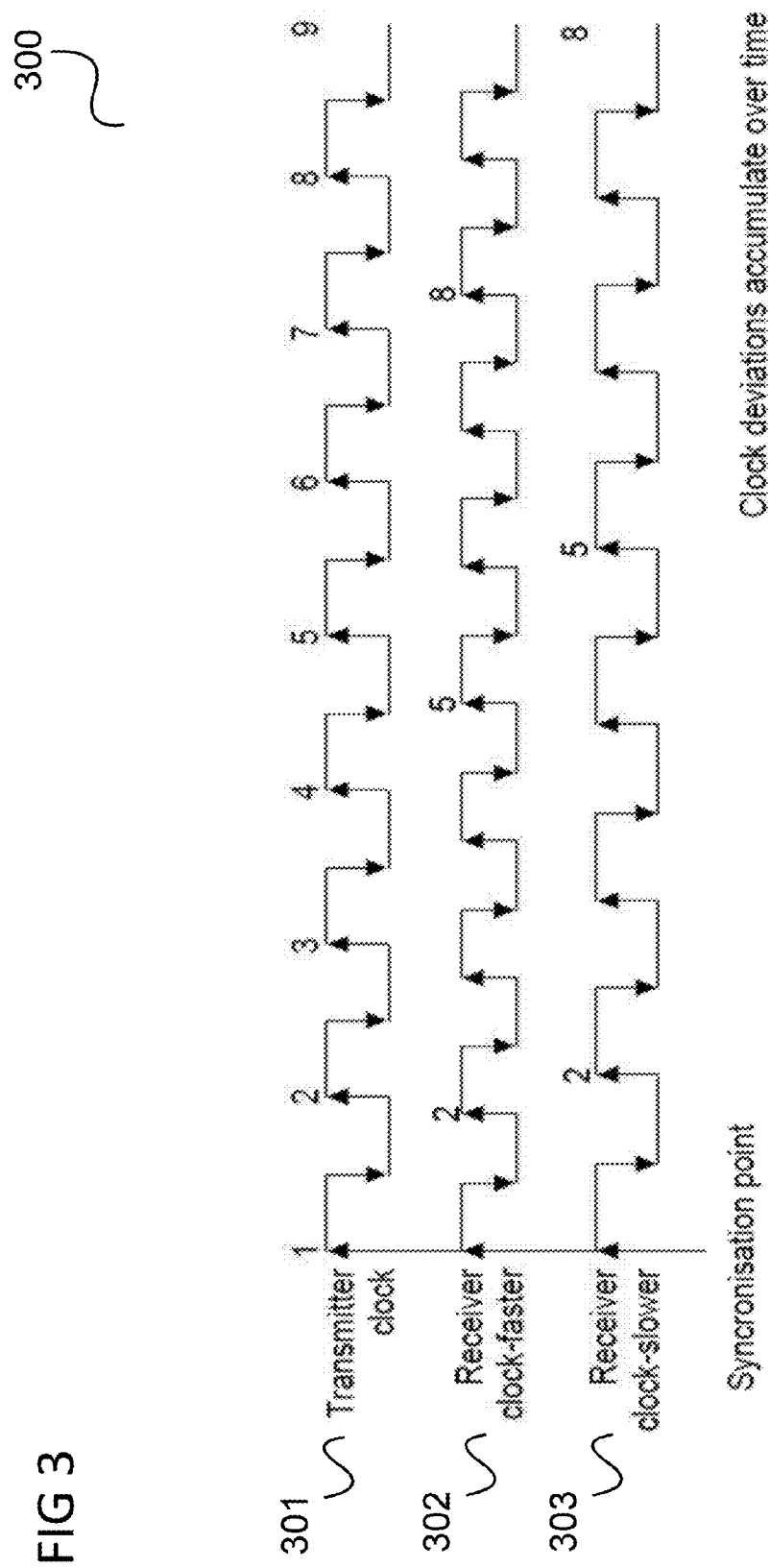
FIG. 3 shows a clock diagram.

Frequency deviation between the transmitter oscillator 105 and the receiver oscillator 106 is illustrated in FIG. 3.

FIG. 3 shows a clock diagram 300.

The clock diagram 300 illustrates a transmitter clock signal (or transmitter timing signal) 301, a first receiver clock signal (or receiver timing signal) 302 (having a lower frequency than the transmitter clock signal 301) and a second receiver clock signal 303 (having a higher frequency than the transmitter clock signal 301).

In the clock diagram 300, a rising edge of a clock signal 301, 302, 303 is indicated by an arrow from bottom to top and a falling edge of a clock signal 301, 302, 303 is indicated by an arrow from top to bottom. The clock cycles (including the time from a rising edge to the next rising edge) are numbered from 1 to 9 in the clock diagram 300.

At the first rising edge (of the clock cycle number 1), the transmitter clock signal 301, the first receiver clock signal 302, and the second receiver clock signal 303 are synchronized.

As illustrated for clock cycle number 2, clock cycle number 5, and clock cycle number 8, the timing deviation due to the frequency deviation between the signals 301, 302, 303 accumulates such that a re-synchronization between the transmitter 101 and the receiver 102 may become necessary before the timing deviation becomes too big (and, for example, transmission errors occur).

For example, a re-synchronization may be required at the start of each frame 201, 202 as illustrated by synchronization points 204 in FIG. 2.

Figure 4:
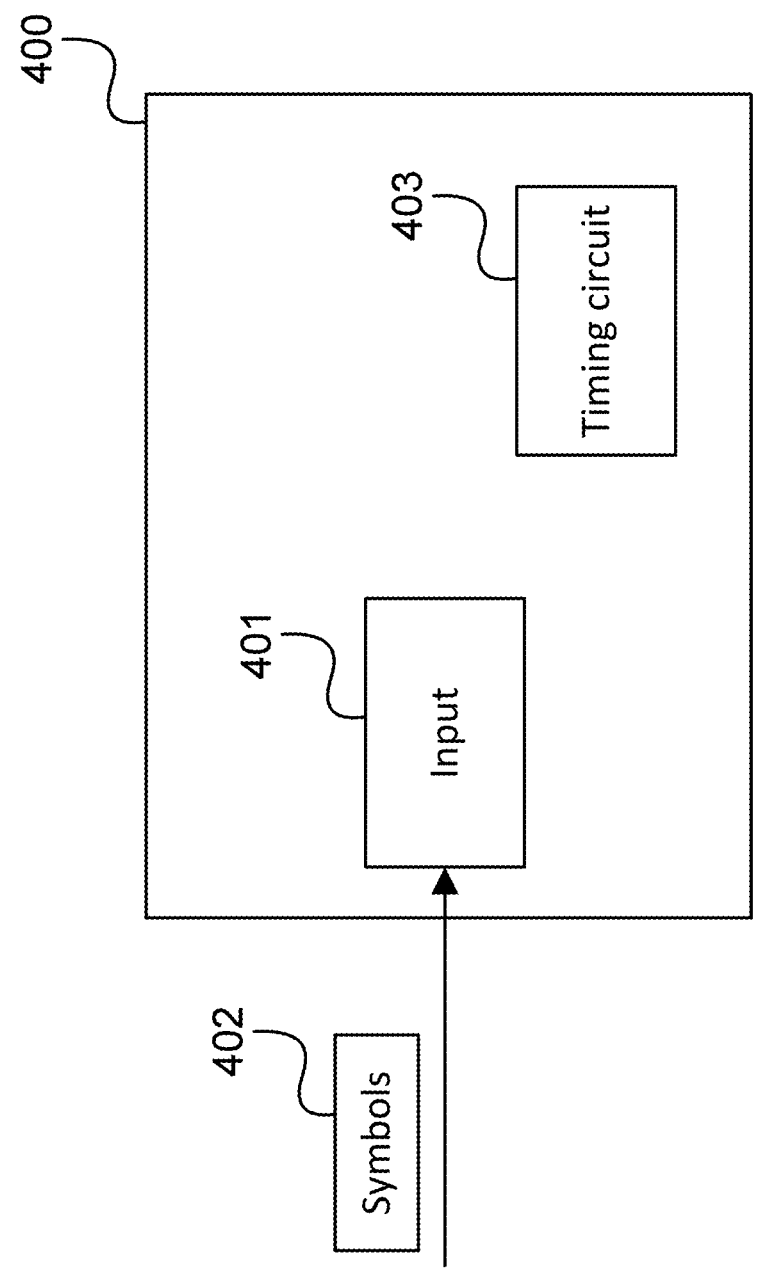
FIG. 4 shows a transmitter according to an embodiment.

According to one embodiment, a transmitter 101 is used as illustrated in FIG. 4.

FIG. 4 shows a transmitter 400 according to an embodiment.

The transmitter 400 includes an input 401 configured to receive a plurality of symbols to be transmitted.

Further, the transmitter 400 includes a timing circuit 402 configured to associate each symbol with a symbol transmission period of a predefined sequence of symbol transmission periods, wherein the symbol transmission periods of the sequence of symbol transmission periods are at least partially different.

According to one embodiment, in other words, a symbol transmission period pattern is used (e.g. for asynchronous serial data transmission) that does not involve constant symbol transmission periods but includes symbol transmission periods of varying length. For example, the symbol transmission periods increase, e.g. from a synchronization point to the next synchronization point. In this case, and in case that the (transmission) symbols are bits, the transmitter may be seen to transmit the symbols using bit-braking. This may be applied to any communication protocol communicating according to frames with synchronization at the start of each frame and/or protocols according to which bit-stuffing may be used within a frame.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

According to one embodiment, the input is configured to receive the plurality of symbols as a sequence of symbols to be transmitted and the timing circuit is configured to associate each symbol of the sequence of symbols with a respective symbol transmission period of the sequence of symbol transmission periods.

According to one embodiment, the timing circuit is configured to associate each symbol of the sequence of symbols with a respective symbol transmission period of the sequence of symbol transmission periods such that a symbol having a position in the sequence of symbols is associated with the symbol transmission period having the same position in the sequence of symbol transmission periods.

According to one embodiment, the sequence includes a first symbol transmission period followed by a second transmission period and the first symbol transmission period is smaller than the second symbol transmission period.

According to one embodiment, the symbol transmission periods of at least a sub-sequence of the sequence of symbol transmission periods (e.g. of the whole sequence of symbol transmission periods) are increasing in course of the sequence.

According to one embodiment, the symbol transmission periods of at least a sub-sequence of the sequence of symbol transmission periods (e.g. of the whole sequence of symbol transmission periods) are linearly increasing in course of the sequence.

According to one embodiment, the symbol transmission periods of at least a sub-sequence of the sequence of symbol transmission periods (e.g. of the whole sequence of symbol transmission periods) are hyperbolically increasing in course of the sequence.

The transmitter may further include a sender configured to send each symbol using its associated symbol transmission period.

The sender may be configured to send the symbols serially using the symbol transmission periods.

For example, the sender is configured to send the symbols over an asynchronous serial channel. For example, Non Return to Zero (NRZ) communication is used by the transmitter.

According to one embodiment, the sender is configured to send the symbols to a receiver.

The transmitter may further include a synchronization circuit configured to perform a transmission timing synchronization with the receiver.

According to one embodiment, the timing circuit is configured to reuse the sequence of symbol transmission periods after a time of synchronization.

The symbols are for example bits.

The transmitter may further include a memory in which information based on which the sequence of symbol transmission periods may be determined is pre-stored.

The transmitter may further include an oscillator configured to generate a reference timing signal and wherein the timing circuit is configured to determine the signal transmission periods based on the reference timing signal. For example, the oscillator is configured to generate a frequency-modulated reference timing signal. This may for example allow reducing electromagnetic emission by spectrum spreading.

Figure 5:
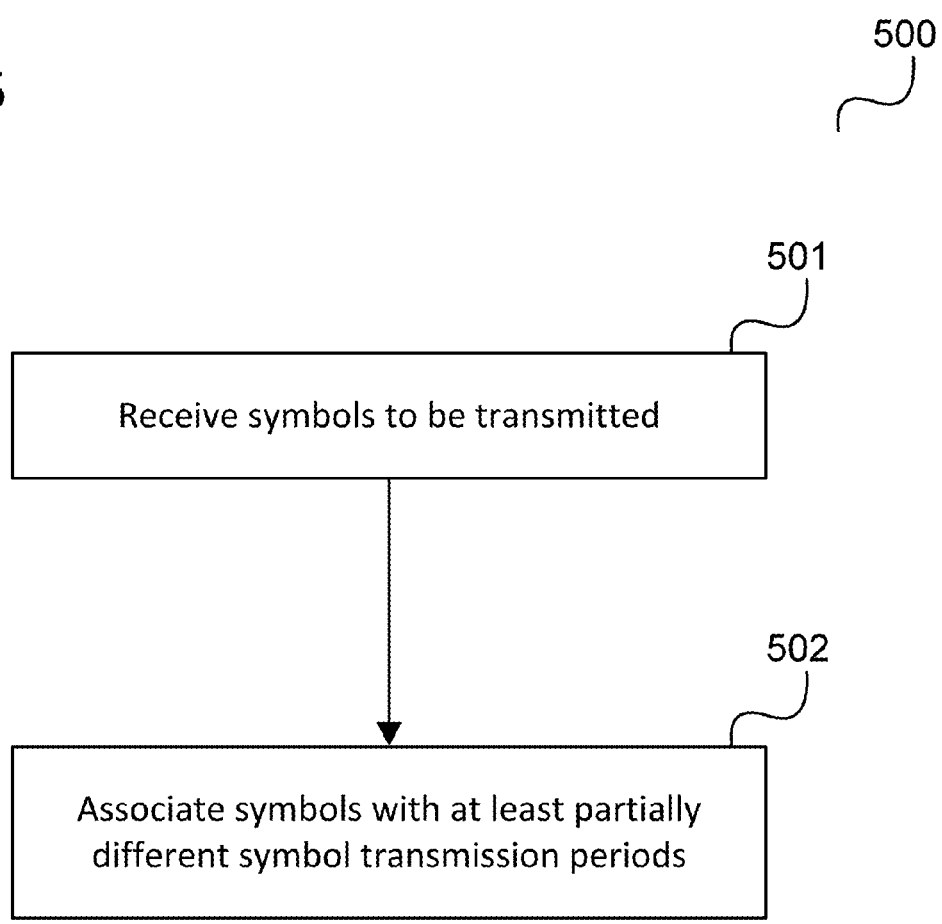
FIG. 5 shows a flow diagram according to an embodiment.

The transmitter 400 for example carries out a method as illustrated in FIG. 5.

FIG. 5 shows a flow diagram 500 according to an embodiment.

The flow diagram 500 illustrates a transmitting method.

In 501, a plurality of symbols to be transmitted is received.

In 502, each symbol is associated with a symbol transmission period of a predefined sequence of symbol transmission periods, wherein the symbol transmission periods of the sequence of symbol transmission periods are at least partially different.

Figure 6:
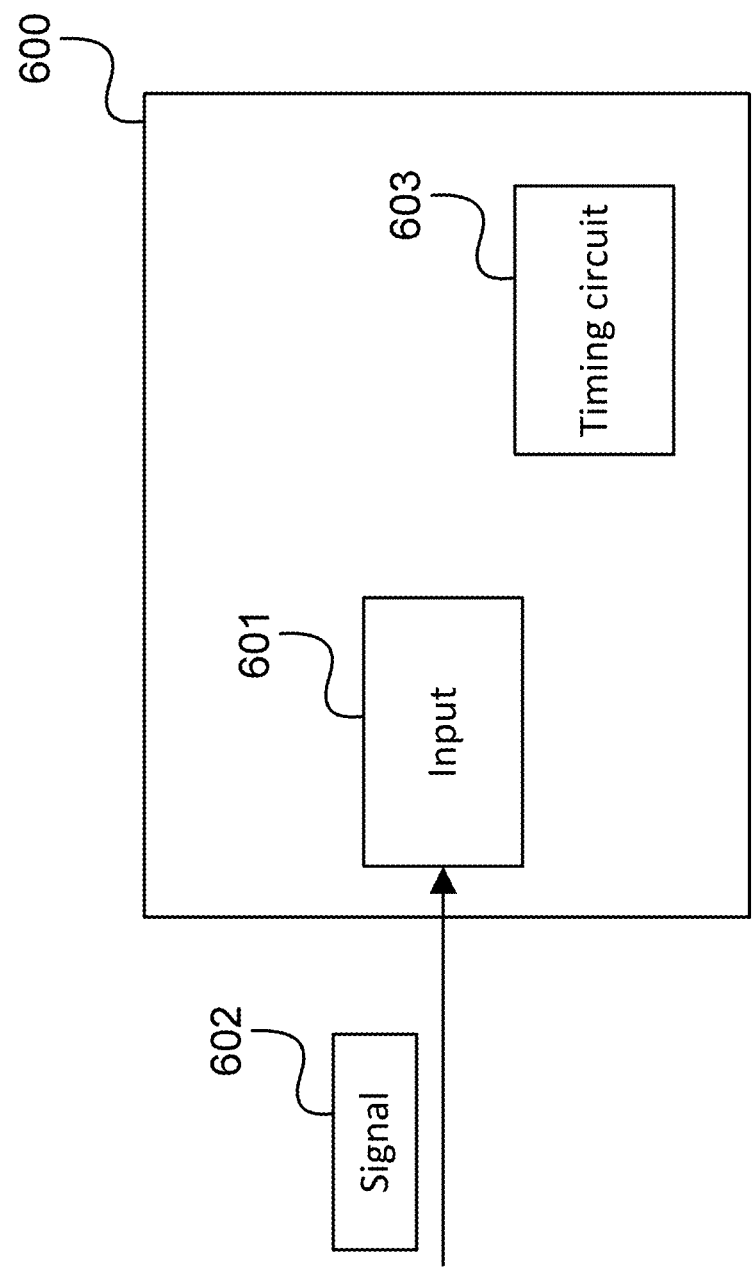
FIG. 6 shows a receiver according to an embodiment.

The transmitter 400 for example communicates with a receiver as illustrated in FIG. 6.

FIG. 6 shows a receiver 600 according to an embodiment.

The receiver 600 includes an input 601 configured to receive a signal 603 and a timing circuit 602 configured to associate each part of the received signal with a symbol transmission period of a predefined sequence of symbol reception periods, wherein the symbol reception periods of the sequence of symbol reception periods are at least partially different.

The receiver may further include a symbol reception circuit configured to determine for each symbol transmission period a transmitted symbol from at least one part of the received signal associated with the symbol transmission period.

Figure 7:
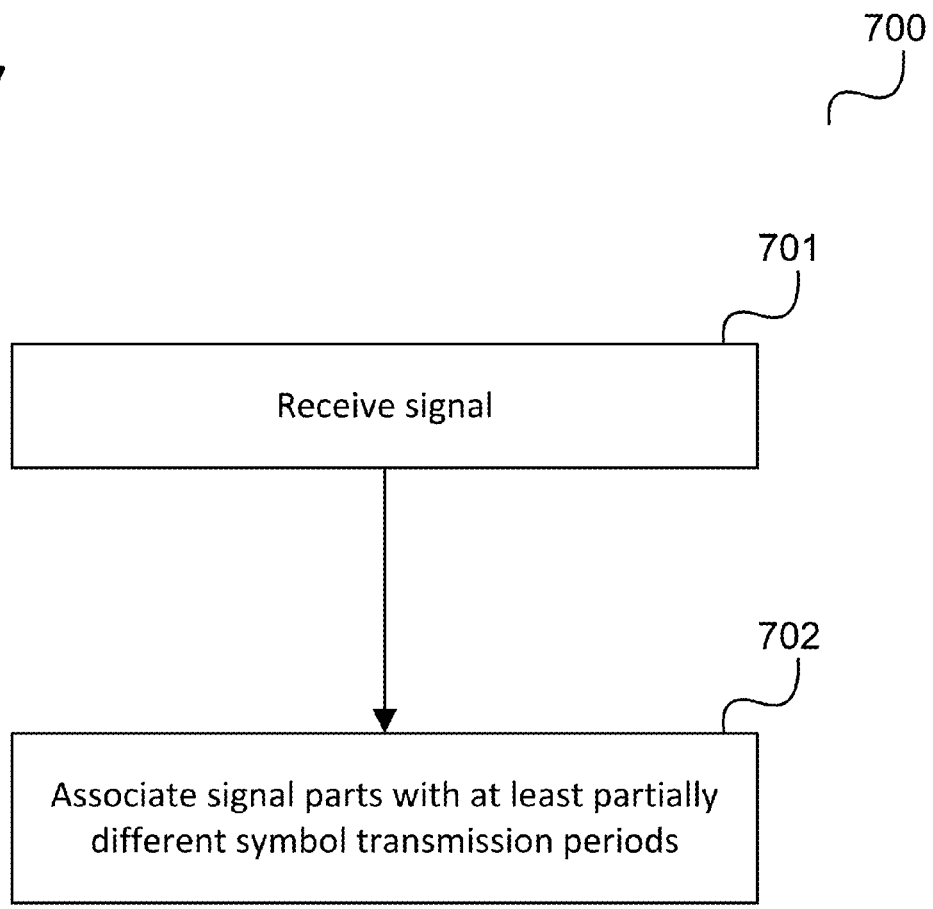
FIG. 7 shows a flow diagram according to an embodiment.

The receiver 600 for example carries out a method as illustrated in FIG. 7.

FIG. 7 shows a flow diagram 700 according to an embodiment.

The flow diagram 700 illustrates a method for receiving.

In 701, a signal is received.

In 702, each part of the received signal is associated with a symbol transmission period of a predefined sequence of symbol reception periods, wherein the symbol reception periods of the sequence of symbol reception periods are at least partially different.

It should be noted that embodiments described in context with the transmitter are analogously valid for the method for transmitting, the receiver, and the method for receiving and vice versa.

In the following, bits are used as examples for transmission symbols. However, other symbols than bits may be used as transmission symbols.

According to an embodiment involving bit-braking the transmitter 101 sends the first bit after a synchronization with the receiver 102 at relatively high speed (i.e. with a relatively short transmission period) and afterwards sends each bit slower than the previous one (i.e. with longer transmission period), for example until the next synchronization with the receiver 102 (or possibly even until the end of the current data transmission). The pattern of symbol transmission periods is also known to the receiver 102 such that it can correctly receive the transmitted bits.

An example for a transmitter according to embodiments is described in the following with reference to FIG. 8.

Figure 8:
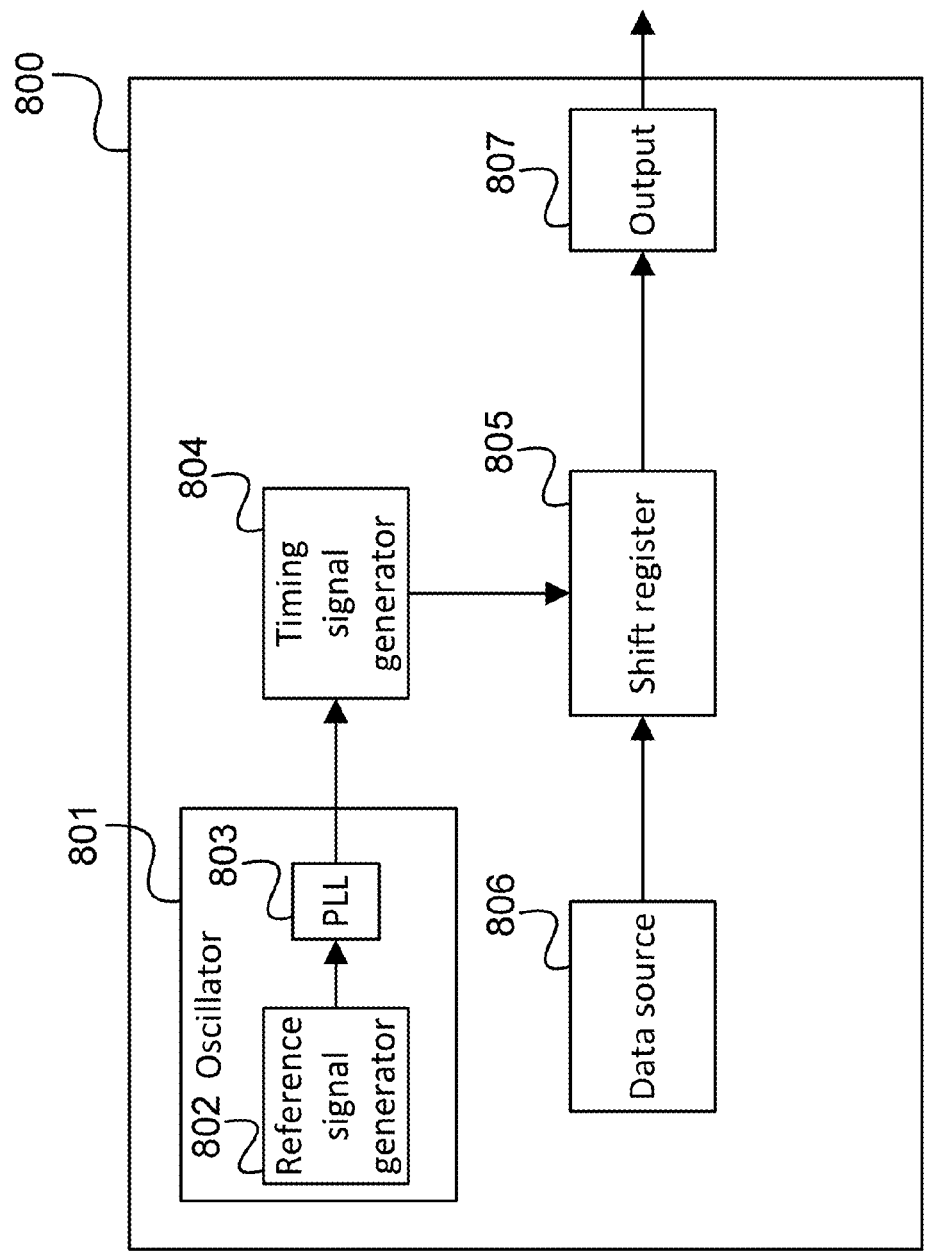
FIG. 8 shows a transmitter according to an embodiment.

FIG. 8 shows a transmitter 800 according to an embodiment.

The transmitter 800 includes an oscillator 801 (e.g. corresponding to the transmitter oscillator 105 shown in FIG. 1). The oscillator 801 is in this example a PLL oscillator including a reference signal generator 802 (such as an oscillating quartz) and a PLL (phase locked loop) 803. The oscillator 801 generates a reference timing signal with frequency $f_{DIV}$ which is supplied to a timing signal generator 804. The timing signal generator 804 generates a timing signal with frequency $f_{BRT}$ based on the reference timing signal. The timing signal is a digital clock signal (with non-constant clock cycles) and is supplied to a shift register 805. The shift register 805 receives data to be sent (i.e. a symbol transmission stream) from a data source 806. The timing signal is used as the clock with which symbols are shifted through the shift register 805 and eventually output. Thus, the shift register 805 outputs the transmission symbols via an output 807, for example to the communication channel 104.

Figure 9:
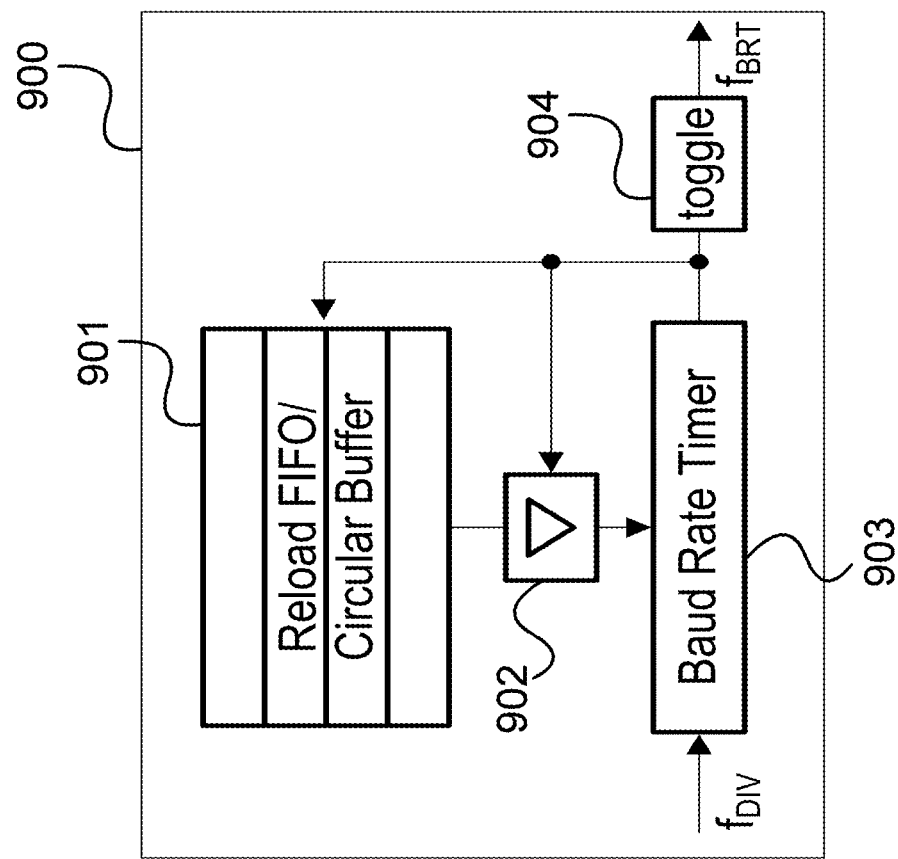
FIG. 9 shows a timing signal generator according to an embodiment.

An example for the timing signal generator 804 is illustrated in FIG. 9.

FIG. 9 shows a timing signal generator 900 according to an embodiment.

The timing signal generator 900 includes a circular buffer 901 (e.g. implemented as a FIFO which is reloaded at its input with the current output value). The circular buffer 901 holds the length of the symbol transmission periods, i.e. each memory element of the circular buffer 901 holds a specification of the length of a symbol transmission period, for example in the form of the number of clock cycles of the reference timing signal. The length specification being stored in the last memory element of the circular buffer 901 (i.e. the memory element at the output of the circular buffer 901) is supplied via a forwarding component 902 (such as a flip flop) to a baud rate timer 903 generating an output signal from the reference timing signal supplied from the oscillator 801 in accordance with the symbol transmission period length specification currently supplied by the forwarding component 902. The output signal of the baud rate timer 903 for example includes a rising edge after as many reference signal clock cycles as determined by the current symbol transmission length specification.

The output of the baud rate timer 903 is supplied to the forwarding component 902 to determine when the next symbol transmission length is to be forwarded to the baud rate timer 903 and to the circular buffer 901 to determine when the contents of the circular buffer 901 should be shifted (i.e. when the contents of the circular buffer 901 are to be cyclically shifted by one memory element).

The output of the baud rate timer 903 is further fed to a toggle flip flop 904 whose output is the timing signal supplied to shift register 805 including a clock cycle length corresponding to the current symbol transmission length specification.

Figure 10:
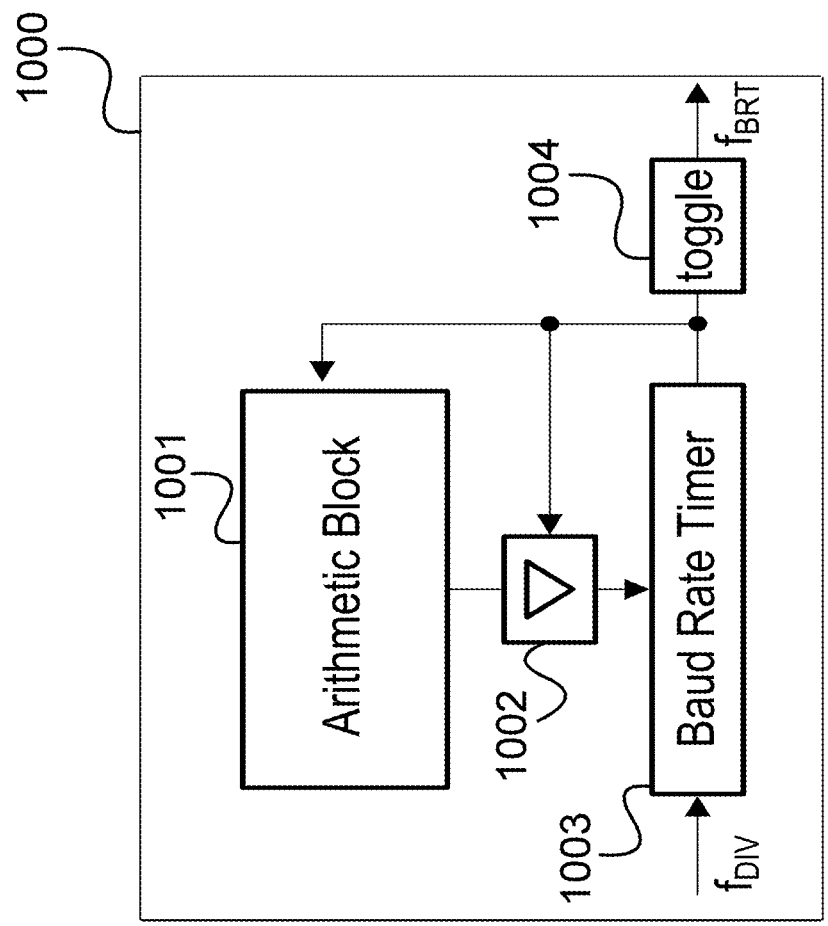
FIG. 10 shows a timing signal generator according to an embodiment.

A further example for the timing signal generator 804 is illustrated in FIG. 10.

FIG. 10 shows a timing signal generator 1000 according to an embodiment.

The timing signal generator 1000 includes an arithmetic block generating the length of the symbol transmission periods, i.e. outputs a specification of the length of a symbol transmission period, for example in the form of the number of clock cycles of the reference timing signal. The current specification is supplied via a forwarding component 1002 (such as a flip flop) to a baud rate timer 1003 generating an output signal from the reference timing signal supplied from the oscillator 801 in accordance with the symbol transmission period length specification currently supplied by the forwarding component 1002. The output signal of the baud rate timer 1003 for example includes a rising edge after as many reference signal clock cycles as determined by the current symbol transmission length specification.

The output of the baud rate timer 1003 is supplied to the forwarding component 1002 to determine when the next symbol transmission length is to be forwarded to the baud rate timer 1003 and to the arithmetic block 1001 to determine the next symbol transmission length (e.g. by adding or subtracting a certain length or percentage, e.g. 10%, to/from the symbol transmission length as represented by the output of the baud rate timer 1003).

The output of the baud rate timer 1003 is fed to a toggle flip flop 1004 whose output is the timing signal supplied to shift register 805 including a clock cycle length corresponding to the current symbol transmission length specification.

It should be noted that the arithmetic block 1001 may use any arithmetic operation to generate the symbol transmission times and may have stored information specifying the rule how to generate the symbol transmission times.

According to one embodiment, the symbol transmission periods are chosen such that bit-braking is used, i.e., the first bit after a re-synchronization point is transmitted with highest speed (i.e. with shortest symbol transmission period), then the speed is reduced for the subsequent bits from bit to bit, and the last bit (of the frame or before the next re-synchronization point) is transmitted with lowest speed. It should be noted that the general tendency to make the bits monotonically longer (i.e. to reduce the transmission speed of the bits) can be violated with extra long or extra short bits in order to optimize the spectrum of the output transmission signal or to achieve other goals.

Figure 11:
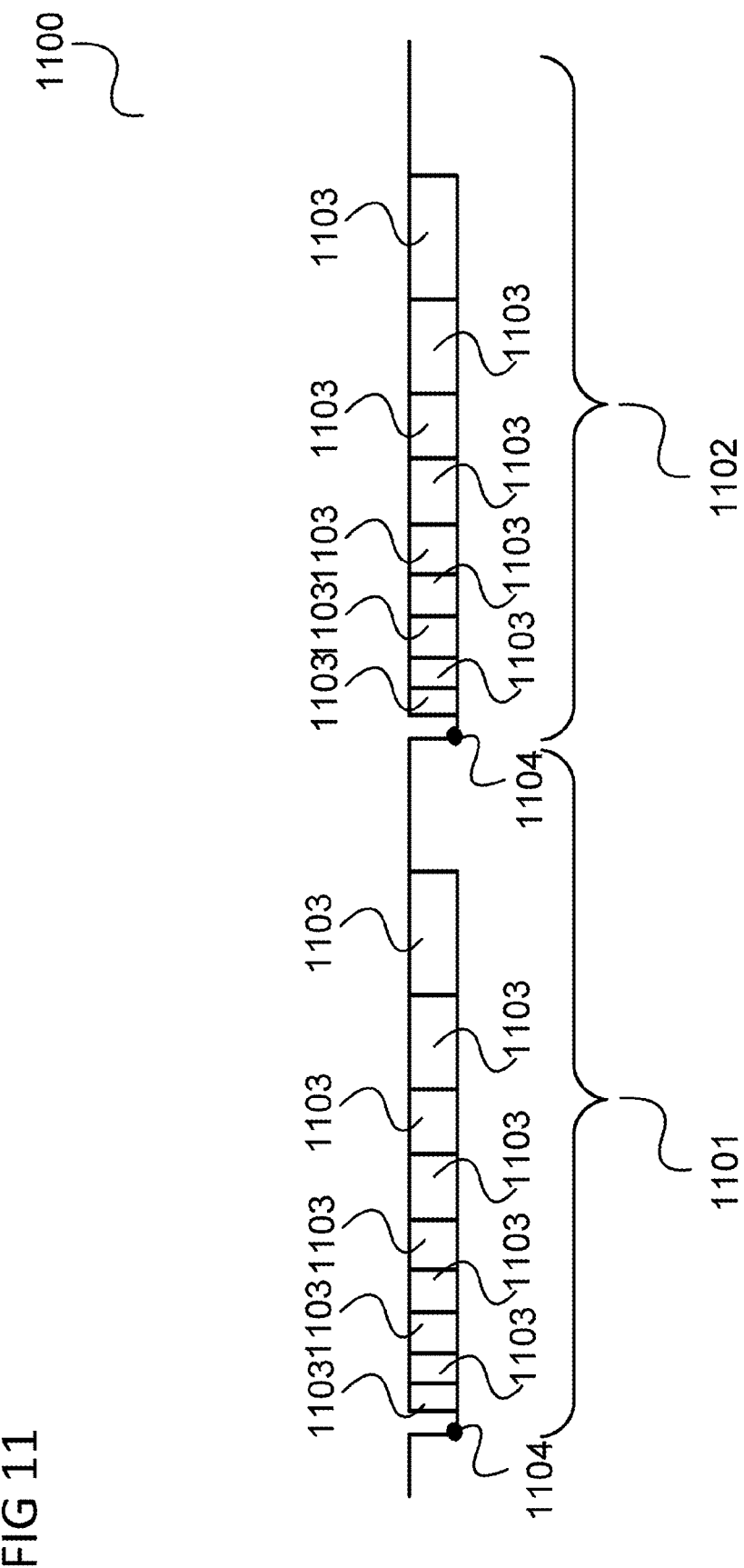
FIG. 11 shows a frame structure.

An example for bit-braking according to an embodiment is illustrated in FIG. 11.

FIG. 11 shows a frame structure 1100.

Similarly as in the example illustrated in FIG. 2, communication via the communication channel 103 is structured according to a plurality of frames, wherein a first frame 1101 and a second frame 1102 are illustrated in FIG. 11 as an example. Each frame includes a plurality of symbol transmission periods 1103 wherein in each symbol transmission period 1103 a transmission symbol is transmitted from the transmitter 101 to the receiver 102. The transmission symbols that are transmitter represent the data 103, e.g. in encoded form.

As can be seen from FIG. 11, the lengths of the symbol transmission periods 1103 increase from a minimum symbol transmission period length directly after a synchronization point 1104 until the next synchronization point 1104.

In the following, a comparison is given between the case of constant symbol transmission periods (as illustrated in FIG. 2) and the varying symbol transmission periods according to bit-braking according to one embodiment.

Figure 12:
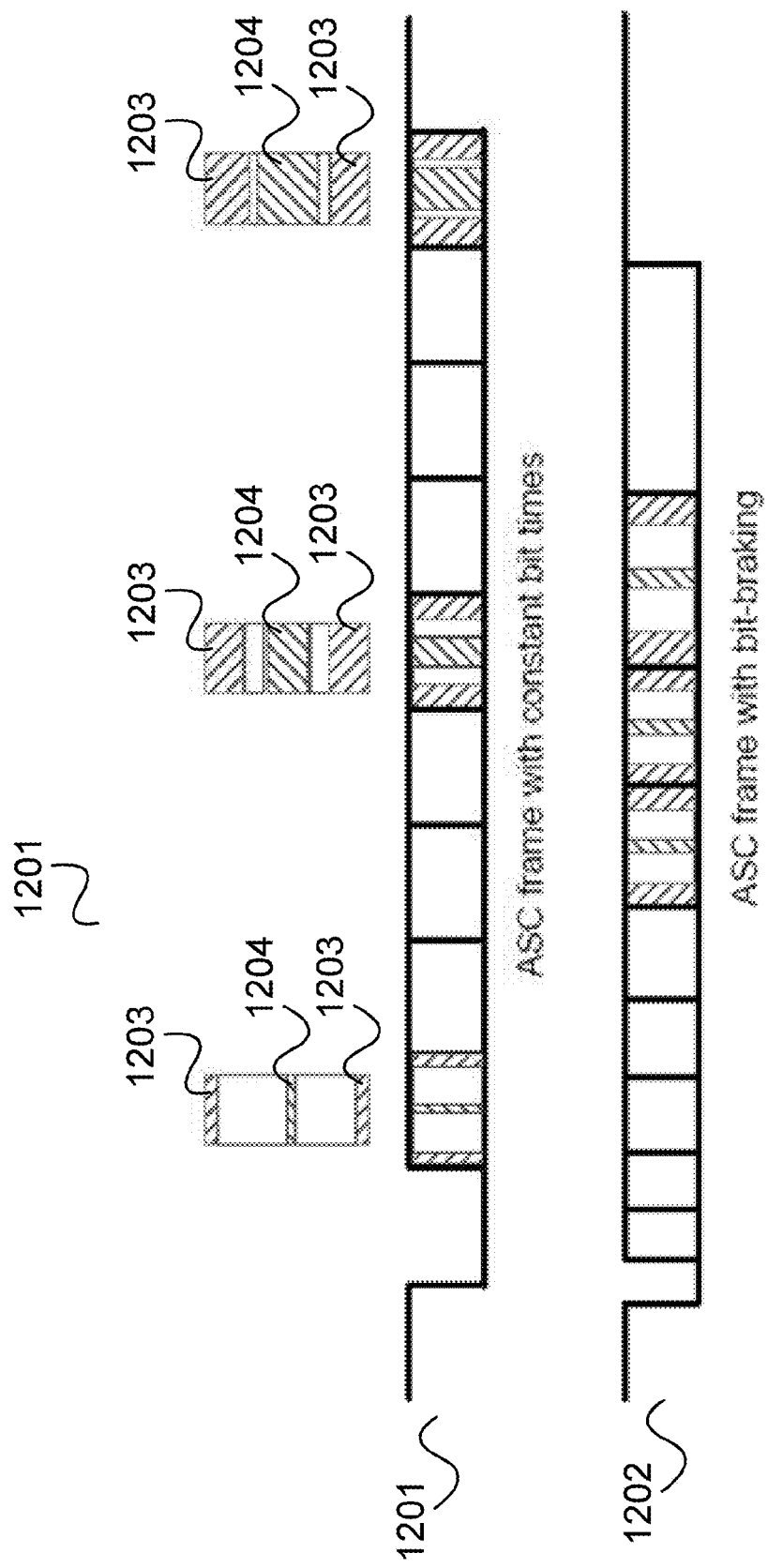
FIG. 12 shows a frame diagram according to an embodiment.

FIG. 12 shows a frame diagram 1200 according to an embodiment.

The frame diagram 1200 includes a first frame 1201 with constant symbol transmission periods corresponding to FIG. 2 and a second frame 1202 with increasing symbol transmission times according to bit-braking.

Due to the mismatch between the transmitter oscillator 1005 and the receiver oscillator 1006, for each symbol transmission period, there is a range of deviation between the start of the of the symbol transmission period as used by the transmitter 101 and as expected by the receiver 102. Similarly, there is a range of deviation between the end of the of the symbol transmission period as used by the transmitter 101 and as expected by the receiver 102. In FIG. 12 and the following FIGS. 13 to 15, these ranges are indicated by a first hatching 1203 (downward diagonals).

Further there is a range of deviation between the center of the of the symbol transmission period as used by the transmitter 101 and as expected by the receiver 102. In FIG. 12 and the following FIGS. 13 to 15, this range is indicated by a second hatching 1204 (upward diagonals). The center of the symbol transmission period is in one embodiment the time at which the receiver samples the transmitted symbol or, from the transmitter point of view, the time at which the transmitter expects the receiver to sample the transmitted symbol. Since the transmitter only transmits the symbol to be transmitted between the start of the transmission period to the end of the transmission period, there needs to be a margin between the start and end deviation ranges (as indicated by the first hatching 1203) and the center deviation range (as indicated by the second hatching 1204). This margin is shown white in FIG. 12 and the following FIGS. 13 to 15 between the start deviation range and the center deviation range or the center deviation range and the end deviation range, respectively. The larger this margin (or safety margin) the better for the transmission (i.e. the less transmission errors).

Three examples for the start, end, and center ranges and the margin are given for each the first frame 1201 and the second frame 1202 in FIG. 12, wherein the exemplary symbol transmission periods for the first frame 1201 are also shown vertically and used to illustrate the hatchings 1203, 1204.

In the example illustrated in the following in FIGS. 13 to 15, a frequency deviation between the transmitter oscillator 1205 and the receiver oscillator 1206 of 2% is assumed.

Figure 13:
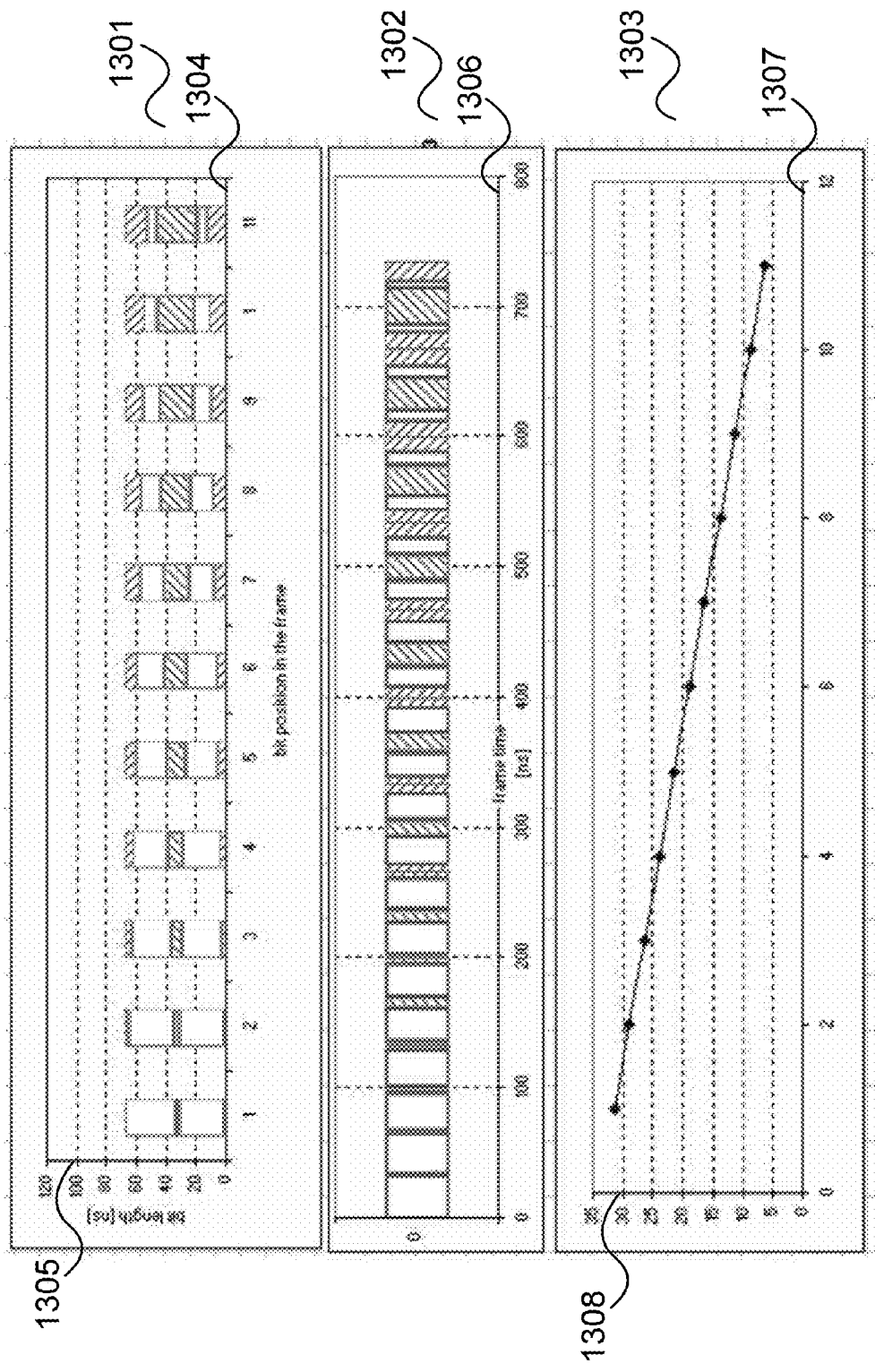
FIGS. 13, 14, and 15 illustrate safety margins with a transmission frame according to different symbol transmission period patterns.
Figure 14:
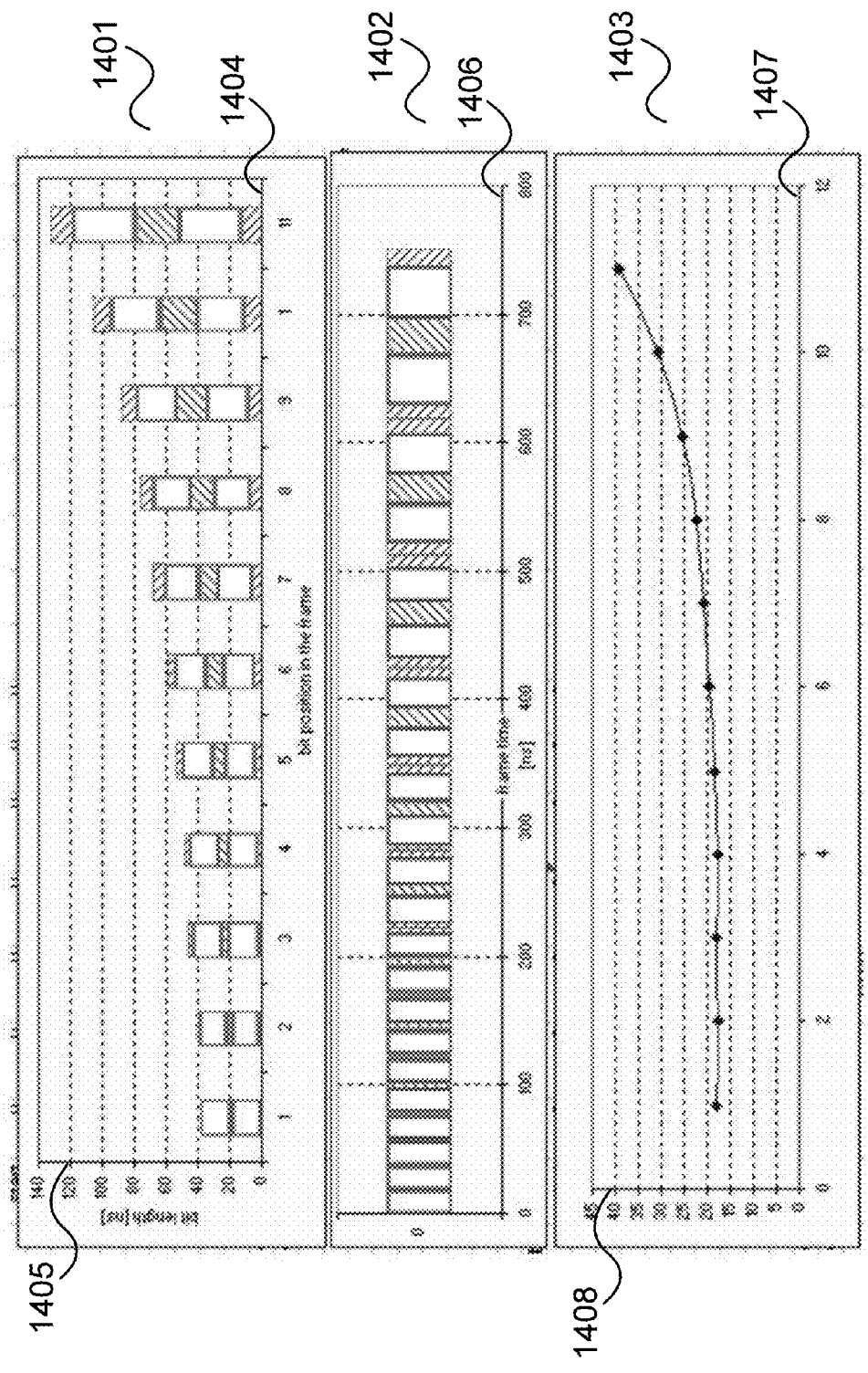
Figure 15:
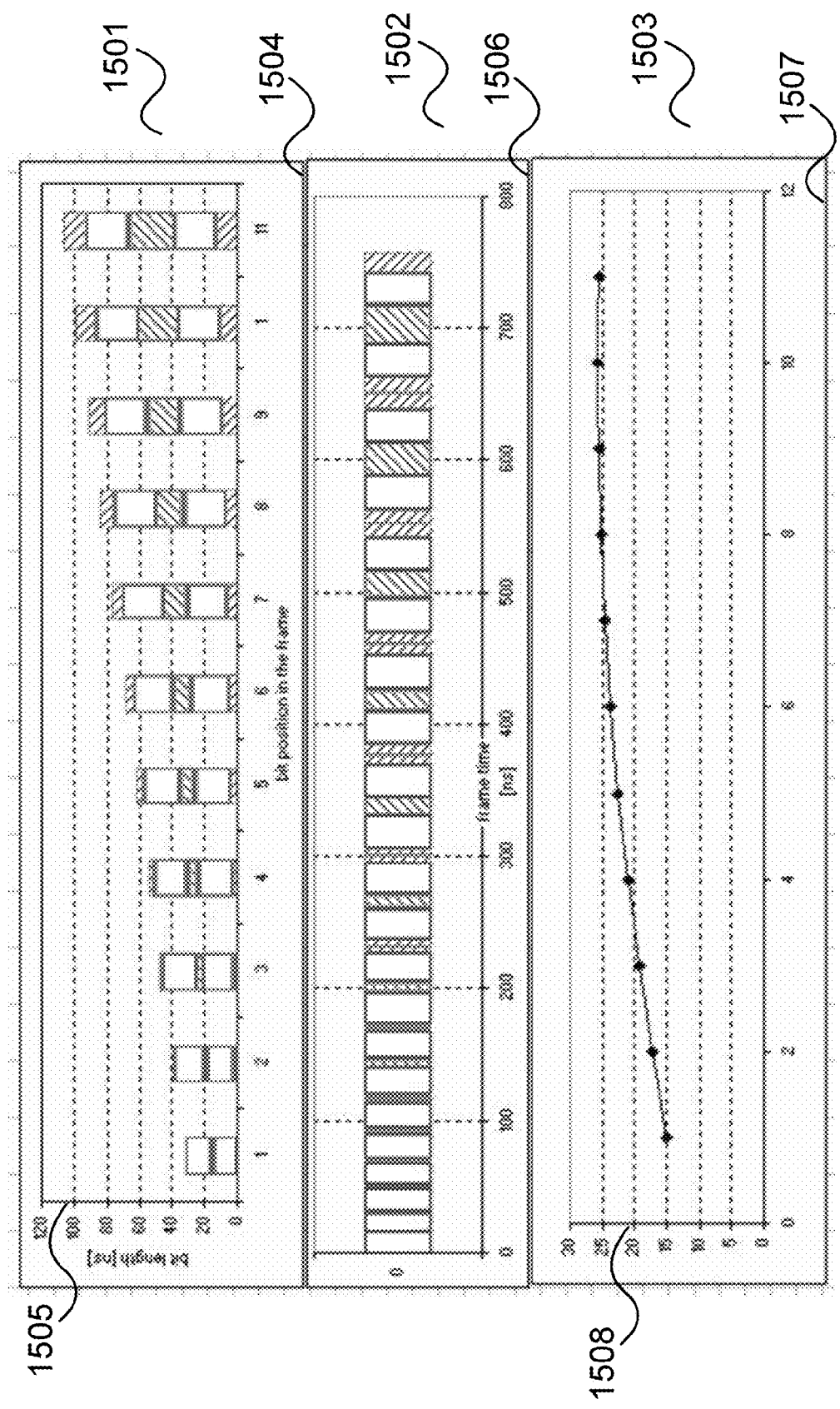

FIGS. 13, 14, and 15 illustrate safety margins with a transmission frame according to different symbol transmission period patterns.

Each of FIGS. 13, 14, 15 includes a first diagram 1301, 1401, 1501 showing for each symbol transmission period (i.e. for each bit in this case) transmitted in the frame vertically the start, end, and center deviation ranges. The bit position within the frame increase from left to right along a bit position axis 1304, 1404, 1504 and the time within the respective symbol transmission period increases from bottom to top along a bit length axis 1305, 1405, 1505.

Further, each of FIGS. 13, 14, 15 includes a second diagram 1302, 1402, 1502 giving an overview of the cumulated lengths of the start, end, and center deviation ranges within the frame to give a feeling about the distribution of the deviation ranges and safety margins within the frame.

Time within the frame increases from left to right along a time axis 1306, 1406, 1506.

Further, each of FIGS. 13, 14, 15 includes a third diagram 1302, 1402, and 1502 showing numerical values for the length of the safety margin for each symbol transmission period.

The bit position within the frame increase from left to right along a bit position axis 1307, 1407, 1507 and the length of the safety margin (e.g. in nanoseconds) increases from bottom to top along a margin length axis 1308, 1408, 1508.

FIG. 13 shows the results for constant bit length (i.e. constant bit transmission period length) for all bits in the frame, i.e. no bit-braking.

FIG. 14 shows the results for hyperbolic bit-braking. Specifically, the bit transmission baud rates decrease from 28 Mbaud for the first bit via 26 Mbaud, 24 Mbaud, 22 Mbaud, 20 Mbaud, 18 Mbaud, 16 Mbaud, 14 Mbaud, 12 Mbaud, 10 Mbaud, to 8 Mbaud of the last bit (the symbol transmission times increase correspondingly).

FIG. 15 shows the results for linear bit-braking. Specifically, the bit transmission periods increase from 30 ns for the first bit via 37 ns, 44 ns, 51 ns, 58 ns, 65 ns, 72 ns, 79 ns, 86 ns, 93 ns to 100 ns for the last bit (the symbol transmission times increase correspondingly).

As can be seen from FIGS. 13 to 15, a higher minimum margin can be achieved when using bit-braking compared to using constant symbol transmission periods. Thus, according to one embodiment, higher frequency deviation between the transmitter oscillator 105 and the receiver oscillator 106 can be tolerated with using bit-braking compared to constant symbol transmission periods. Further, the requirement for measures such as bit-stuffing and frequent re-synchronization points can be avoided and thus the frame length can be made more deterministic. In case that bit stuffing is not needed and there is a re-synchronization point at the start of a frame the frame length becomes fully deterministic (i.e. no varying of the frame length becomes necessary due to transmitter receiver frequency deviation). In addition, frequency-modulated oscillators may be used (such as FMPLLs, frequency-modulated phase locked loops) while still being able to use asynchronous communications due to the increased safety margins. Usage of frequency-modulated oscillators allows reducing the electromagnetic emission by higher spectrum spreading compared to a fixed oscillator frequency.

Another issue in communication between the transmitter 101 and the receiver 102 may be, depending on the system in which the communication arrangement 100 is used, that electromagnetic emission by the communication channel 103 (e.g. from a wire implementing the communication channel 103) should be kept at a level so not to disturb electronic systems in the vicinity.

Measures to keep electromagnetic emission (e.g. at a fundamental frequency of the communication) low are for example to use low capacitive load transmission lines, shielded twisted pair cables, or high precision oscillators which may however increase the cost of the communication arrangement 100.

In the following, a comparison between the electromagnetic emission levels for the cases of constant symbol transmission times and bit braking are given in FIGS. 16, 17, and 18.

Figure 16:
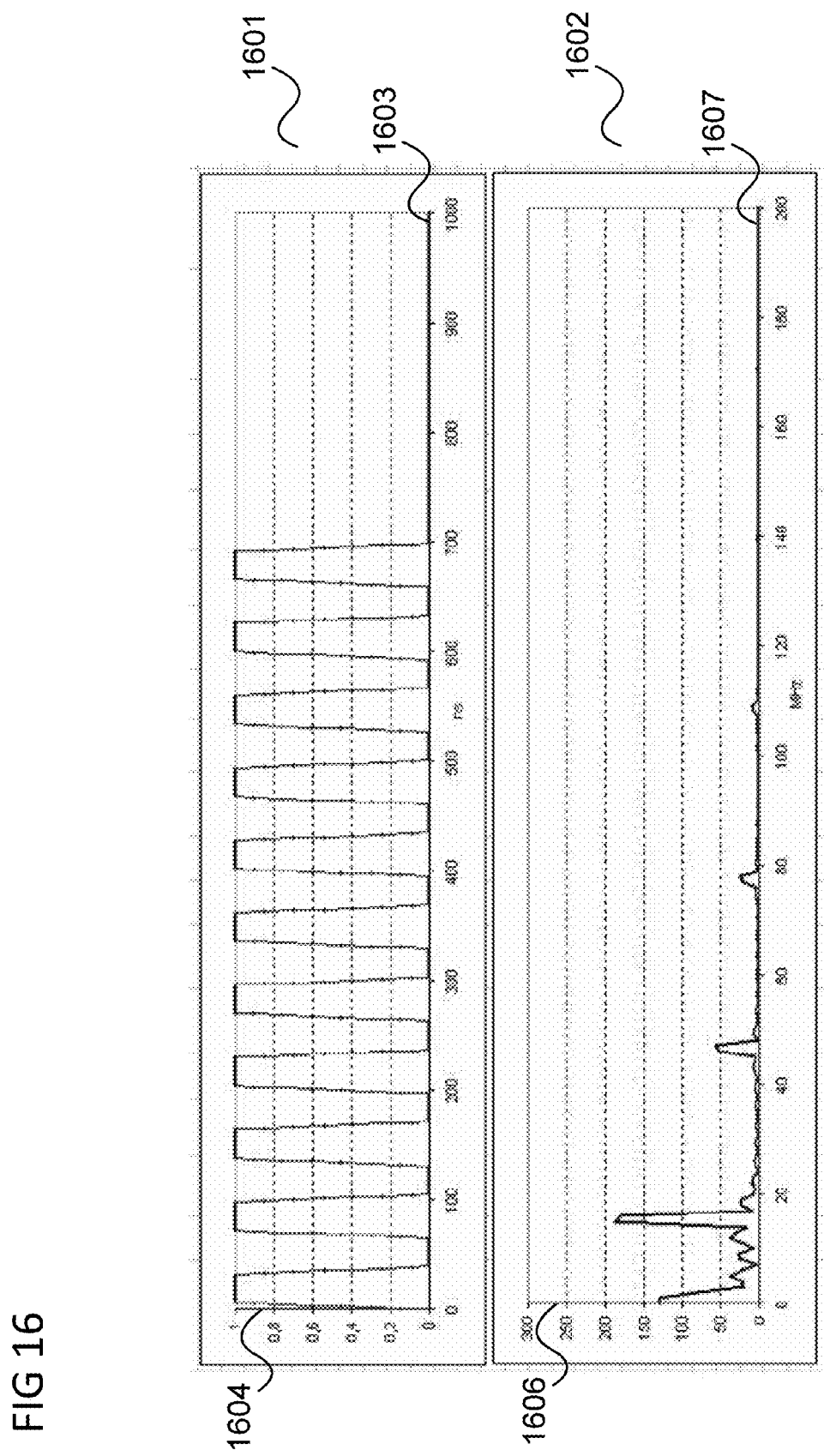
FIGS. 16, 17, and 18 illustrate electromagnetic emission levels.
Figure 17:
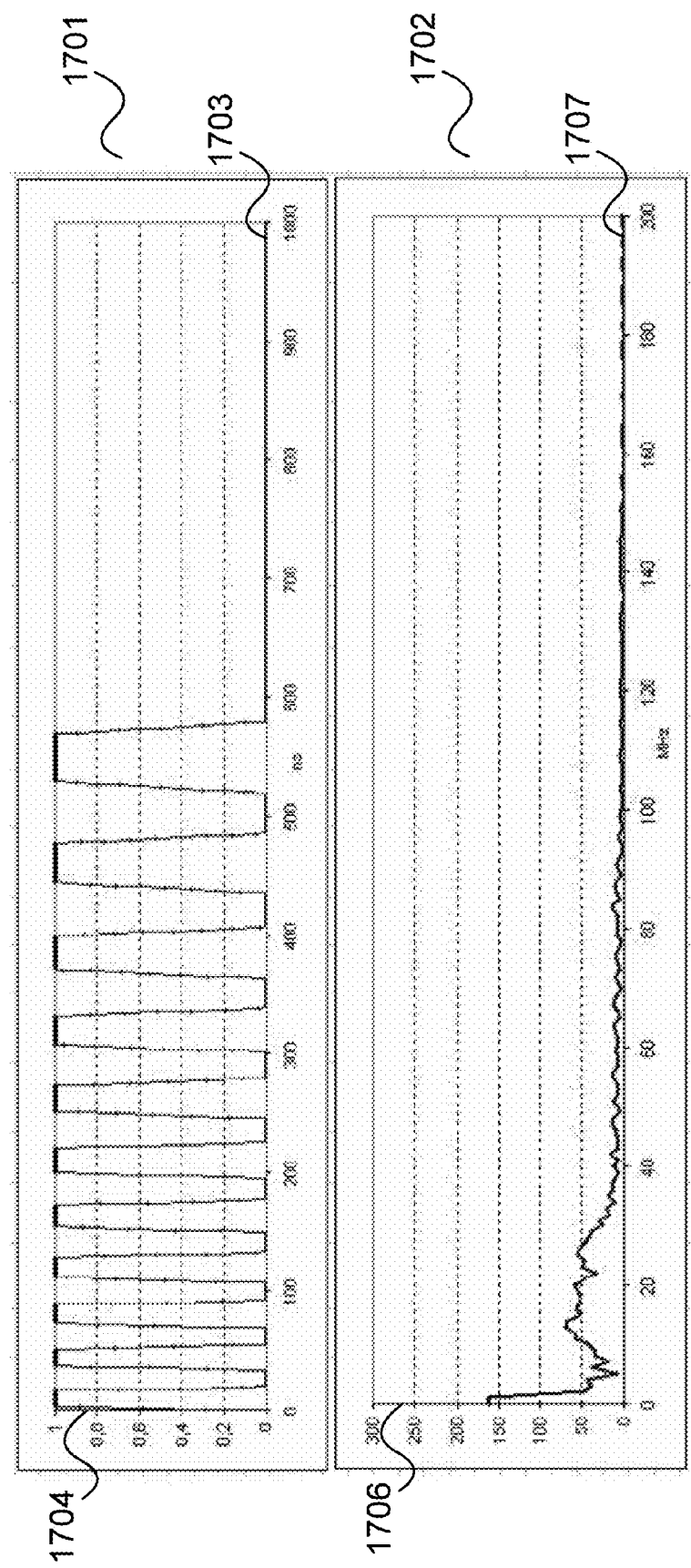
Figure 18:
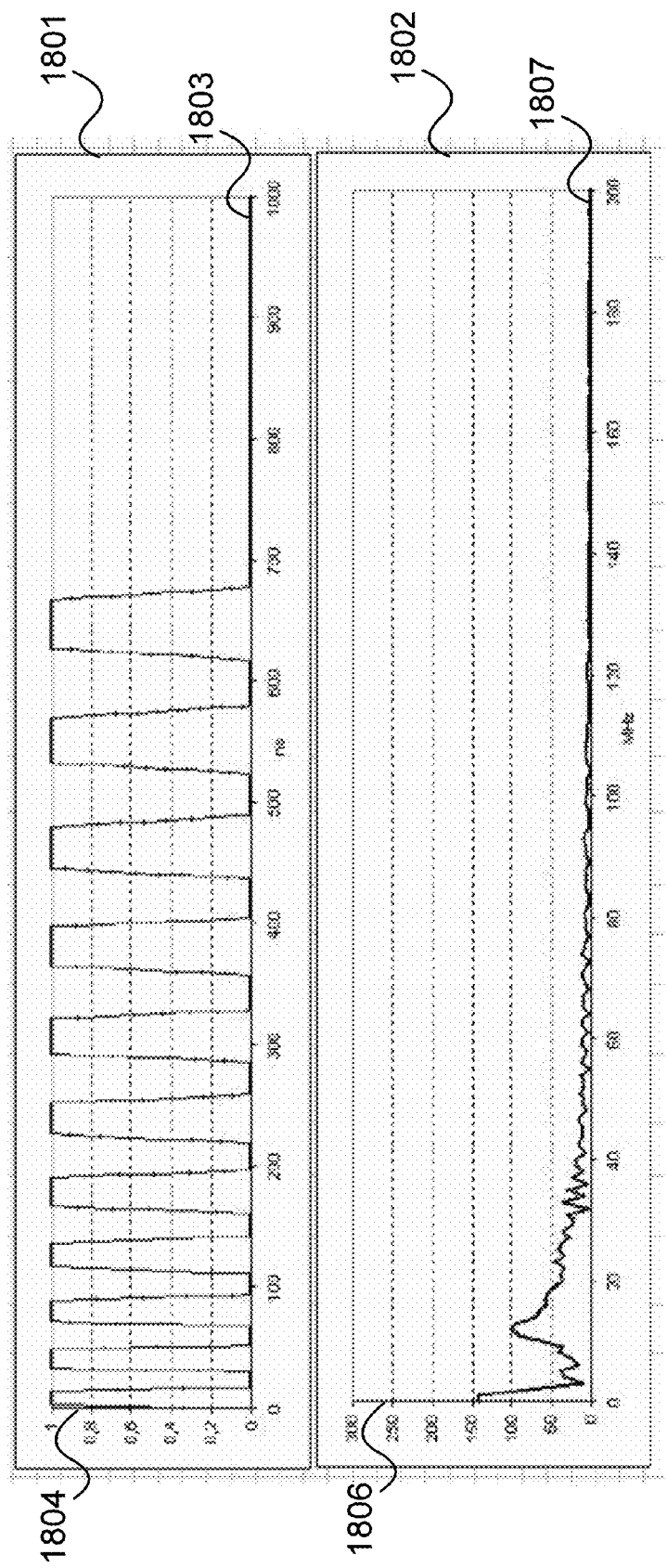

FIGS. 16, 17, and 18 illustrate electromagnetic emission levels.

Each of FIGS. 16, 17, and 18, includes a first diagram 1601, 1701, 1801 illustrating the timing signal of the respective transmission. Time increases along time axis 1603, 1703, 1803 and the level of the timing signal (e.g. a voltage level) increases along a level axis 1604, 1704, and 1804.

Further, each of FIGS. 16, 17, and 18, includes a second diagram 1602, 1702, 1802 showing the spectrum of the respective timing signal. Frequency increases along a frequency axis 1605, 1705, 1805 and power increases along a power axis 1606, 1706, and 1806.

FIG. 16 shows the results for constant bit length, FIG. 17 shows the results for hyperbolic bit-braking, and FIG. 18 shows the results for linear bit-braking correspondingly to FIGS. 13, 14, and 15.

It can be seen that with bit-braking there is less electromagnetic radiation at the fundamental frequency of the transmission compared to the case of constant symbol transmission periods (in other words, there is higher spectrum spreading for bit-braking). Furthermore, it can be seen that in terms of electromagnetic radiation, hyperbolic bit-braking is superior to linear bit-braking by a factor of 2. It should be noted that to reduce high frequency components it has been assumed that for bits that are transmitted more slowly (i.e. with a longer transmission period), less steep clock edges are used.

In summary, among the three exemplary transmission patterns of constant transmission periods (i.e. constant bit rate), hyperbolic bit-braking and linear bit-braking the frame using hyperbolic bit-braking shows the best safety margins and highest spectrum spreading (and thus the least overall electromagnetic emission).

It should further be noted that with bit-braking, the first symbol transmission periods after a re-synchronization can even be smaller than the first symbol transmission periods after a re-synchronization with constant symbol transmission periods. Thus, it may be possible to fit the transmission of more bits into a frame (i.e. in a certain transmission interval) and thus increase throughput.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A receiver comprising:
an input configured to receive a sequence of symbols;
a timing circuit configured to associate each symbol of the received sequence of symbols with a respective symbol reception period of a predefined sequence of symbol reception periods;
wherein each successive symbol reception period of at least a sub-sequence of the predefined sequence of symbol reception periods increases.

2. The receiver according to claim 1, further comprising a symbol reception circuit configured to determine for each symbol reception period a transmitted symbol from at least one part of the received sequence of symbols associated with the symbol reception period.

3. The receiver according to claim 2, wherein the symbols are bits.

4. The receiver according to claim 1, wherein each successive symbol reception period of the sub-sequence increases linearly.

5. The receiver according to claim 1, wherein each successive symbol reception period of the sub-sequence increases hyperbolically.

6. The receiver according to claim 1, being configured to receive the sequence of symbols over an asynchronous serial channel.

7. The receiver according to claim 1, being configured to receive the sequence of symbols from a sender.

8. The receiver according to claim 7, further comprising a synchronization circuit configured to perform a transmission timing synchronization with the sender.

9. The receiver according to claim 8, wherein the timing circuit is configured to reuse the predefined sequence of symbol reception periods after a time of synchronization.

10. The receiver according to claim 1, further comprising a memory in which information based on which the predefined sequence of symbol reception periods may be determined is pre-stored.

11. The receiver according to claim 1, further comprising an oscillator configured to generate a reference timing signal and wherein the timing circuit is configured to determine the symbol reception periods based on the reference timing signal.

12. The receiver according to claim 11, wherein the oscillator is configured to generate a frequency-modulated reference timing signal.

13. A method for receiving comprising:
receiving a sequence of symbols;
associating each symbol of the received sequence of symbols with a respective symbol reception period of a predefined sequence of symbol reception periods;

wherein each successive symbol reception period of at least a sub-sequence of the predefined sequence of symbol reception periods increases.

* * * * *